United States Patent [19]

Nitta

[11] Patent Number: 5,259,741
[45] Date of Patent: Nov. 9, 1993

[54] ROTARY DRAINAGE PUMP LUBRICATION DEVICE AND SEPARATOR

[75] Inventor: Kozaburo Nitta, Osaka, Japan

[73] Assignee: Engineering Corporation, Osaka, Japan

[21] Appl. No.: 925,381

[22] Filed: Aug. 4, 1992

[30] Foreign Application Priority Data

Apr. 3, 1992 [JP] Japan .................. 4-112267

[51] Int. Cl.⁵ .................. F01C 1/00; F04C 18/00
[52] U.S. Cl. .................. 418/102; 418/269; 418/DIG. 1
[58] Field of Search .................. 417/900; 418/DIG. 1, 418/269; 102; 210/258, 416.1, 388

[56] References Cited

U.S. PATENT DOCUMENTS

| | | | |
|---|---|---|---|
| 3,372,646 | 3/1968 | Pinkas et al. | 418/102 |
| 4,190,538 | 2/1980 | Chen | 418/102 |
| 4,897,194 | 1/1990 | Olson | 210/416.1 |
| 5,051,065 | 9/1991 | Hansen | 418/269 |
| 5,160,252 | 11/1992 | Edwards | 418/DIG. 1 |

FOREIGN PATENT DOCUMENTS

| | | |
|---|---|---|
| 50-6044 | 3/1975 | Japan . |
| 53-85603 | 7/1978 | Japan . |
| 62-95188 | 6/1987 | Japan . |
| 173375 | 7/1990 | Japan .................. 418/269 |

*Primary Examiner*—Richard A. Bertsch
*Assistant Examiner*—Roland McAndrews
*Attorney, Agent, or Firm*—Thompson, Hine and Flory

[57] ABSTRACT

A device to separate muddy water from slurry which is being drained away and a means to use said muddy water to both seal and lubricate a gap between the guide channels and the vanes of the drainage pump, thereby securing the efficient long-term functioning of the pump. The invention presupposes the use of a vane type rotary drainage pump connected to a separation means which is set up to remove muddy water from the slurry discharged from the discharge port. A pressure chamber is incorporated into said rotor and connection with the inner ends of each of said guide channels. The muddy water separated out by the separation means is fed back into said pressure chamber.

13 Claims, 6 Drawing Sheets

ROTARY DRAINAGE PUMP LUBRICATION DEVICE AND SEPARATOR

BACKGROUND OF THE INVENTION

1. Field of the Invention

The invention relates to a lubrication device for lubrication of the area around the vanes of a rotary drainage pump, and the separator which is used in the accomplishment of this purpose.

2. Description of the Prior Art

As illustrated by the disclosure contained in Japanese Utility Model Laying Open Gazette S53-85603, known rotary drainage pumps have conventionally comprised a casing incorporating a rotor chamber that connects with an intake port and a discharge port, the rotor inside said rotor chamber having the capacity to rotate eccentrically with respect to the center of said rotor chamber and also having guide channels extending along the radius of rotation, and vanes fitted such that they are also able to travel radially into said guide channels while at the same time dividing the space between said casing and said rotor into a plurality of operation chambers.

When this type of rotary drainage pump is used for the removal of materials such as slurry, the problem arises that the slurry tends to get in between the guide channel and the vanes with the result that the movement of the vanes is hampered and the overall effectiveness of the pump impaired. For the removal of materials such as slurry, it is usually better, from the point of view of conveying the slurry to the discharge point, to reduce the amount of water contained in the slurry first. In other words, slurry with a low water content (weight of water contained as a multiple of the weight of the solids contained in the slurry) is to be preferred.

SUMMARY OF THE INVENTION

This invention has been devised with the above problems in mind and it is the primary object of the invention to separate muddy water from slurry and to use said muddy water as a means both of sealing and of lubricating tile gaps between the guide channels and the vanes, thereby reducing the water content of the slurry for discharge while at the same time ensuring the efficient long-term functioning of the pump itself. In this connection, it is a further object of the invention to provide a separator which has the capacity to perform precise separation of muddy water from slurry which is being discharged.

In order to achieve the above objects, the invention presupposes the use of a rotary drainage pump which comprises a casing incorporating a rotor chamber that connects with an intake port and a discharge port, the rotor inside said rotor chamber having the capacity to rotate eccentrically with respect to the center of said rotor chamber and also having guide channels extending along the radius of rotation, and vanes fitted such that they are also able to travel radially into said guide channels while at the same time dividing the space between said casing and said rotor into a plurality of operation chambers. A separation means separates muddy water from the slurry which is discharged from the aforementioned discharge port. A pressure chamber is incorporated into said rotor and connected with the inner ends of which of said guide channels. The muddy water separated out by the aforementioned separation means is subsequently fed into said pressure chamber.

When the rotor of a pump of the type described above rotates, the cubic capacity of the operation chambers expands and contracts, thereby drawing in material such as slurry through the intake port and subsequently transferring it to the discharge port for discharge.

Part of said slurry is at the same time fed into a separation means where muddy water is separated out from the slurry and fed back into the pressure chamber. From said pressure chamber, the muddy water is then fed into the inner ends of the guide channels where it passes between the guide channels and the vanes and is finally discharged from the outer ends of the guide channels into the operation chambers. The flow of muddy water from the inner ends of the guide channels to the outer ends of the channels both prevents the infiltration of slurry from the operation chambers into the guide channels and, at the same time, supplies lubrication to the area between the guide channels and the vanes. This assists the continued smooth movement of the vanes and, in so doing, helps ensure the efficient functioning of the rotary drainage pump over the long term. Moreover, since the muddy water which is fed back into the operation chambers has itself been obtained from the slurry which is to be discharged, the ultimate water content of said slurry remains unchanged. The slurry can thus be discharged in a condition of low water content.

The separator, which constitutes the main part of the separation means, comprises a plurality of circular rods arranged side by side around the inside of said casing without gaps between them such that they completely surround the path along which the slurry flows. The rods themselves are secured to the casing at each end and also at a point mid-way along the rods but, in the latter, case, in such a way as to allow the rods some scope for flexure in a radial direction.

The use of this type of design ensures that the pulsing motion of the slurry as it passes through the separator will cause gaps to form periodically between the circular rods, thereby allowing the water contained in the slurry to escape into the casing. The removal of the water in turn helps increase the efficiency with which the slurry is conveyed through the system while at the same time reducing the velocity of the flow of slurry, thereby preventing the occurrence of damage to the slurry drainage pipe caused by the presence of sand and small stones in the slurry.

DETAILED DESCRIPTION OF THE PREFERRED EMBODIMENT

Figure 1:
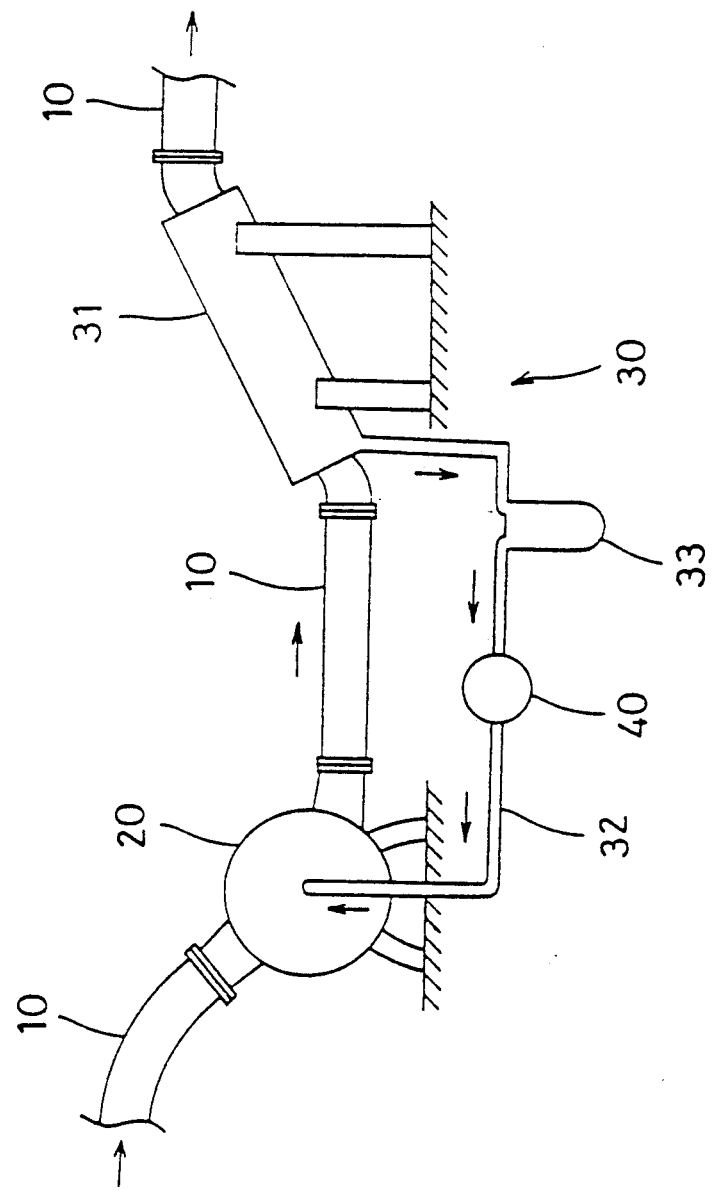
FIG. 1 is a drawing of the whole of the preferred embodiment of the invention.
Figure 2:
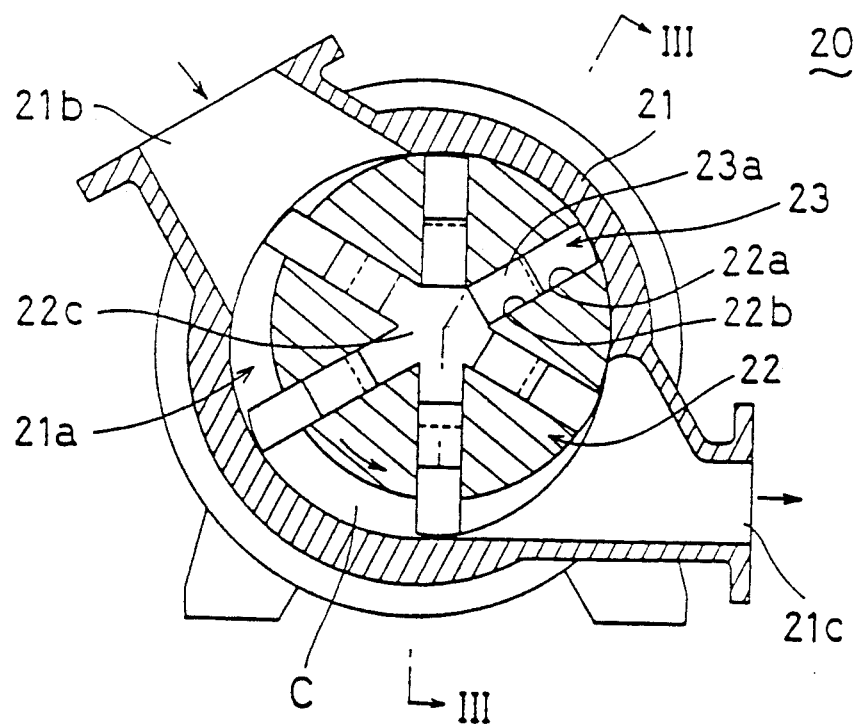
FIG. 2 is a longitudinally sectioned side view of the rotary drainage pump of the preferred embodiment.
Figure 3:
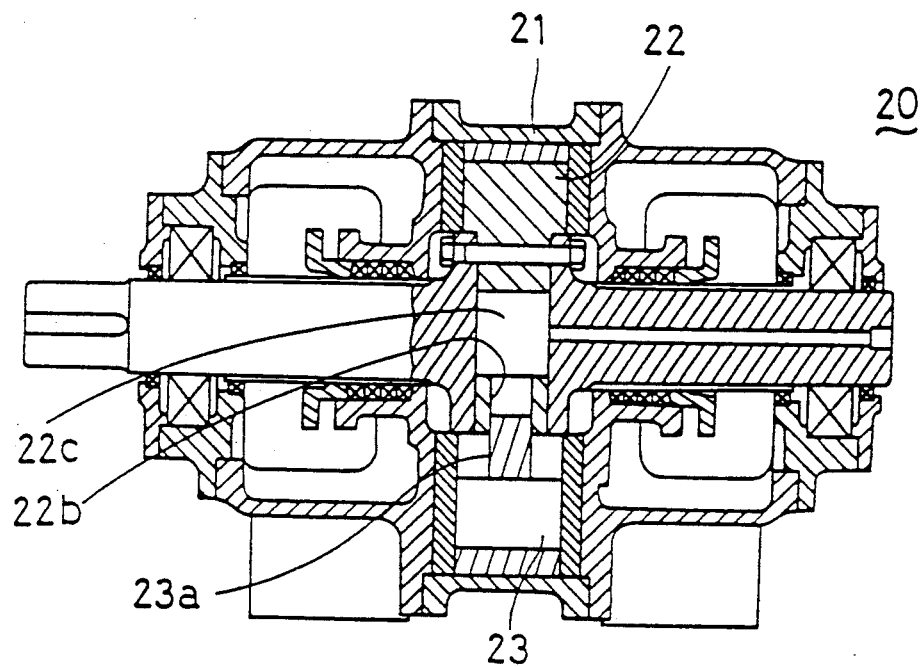
FIG. 3 is a cross section view taken in the line III—III of FIG. 2.

There follows a description of the preferred embodiment of the invention by reference to the accompanying drawings. FIG. 1 shows the lubrication device of the rotary drainage pump of the preferred embodiment of the invention. The whole series of devices shown in the drawing are mounted on a dredger and 10 is a drainage pipe, one end of which is connected to an underwater cutter and the other end of which runs up onto the dredger. A rotary drainage pump 20 is fitted at a point along the slurry drainage pipe 10. There now follows a description of said rotary drainage pump 20 by reference to FIG. 2 and FIG. 3 in which 21 is a casing incorporating a circular cross-sectioned rotor chamber 21a. Said casing 21 has an intake port 21b on one side and a discharge port 21c on the other side, each of said ports 21b, 21c connecting with said rotor chamber 21a. Said casing 21 also holds a rotor 22 which is able to rotate inside the casing. Said rotor 22 rotates eccentrically in relation to the center of the rotor chamber 21a. The rotor also has a plurality of guide channels 22a extending radially away from the center of rotation.

Into the guide channels 22a are slotted vanes 23, which are able to travel along the radius of rotation and which divide the space between the casing 21 and the rotor 22 into a plurality of operation chambers C. Said rotor 22 also incorporates a pressure chamber 22c which connects with the inner ends of each of the aforementioned guide channels 22a. To be more precise, at the bottom of each of said guide channels 22a there is a cylinder 22b extending along the radius of rotation and connecting at the bottom with the aforementioned pressure chamber 22c. At the same time, a cylindrical piston 23a is linked to the base of each of said vanes 23, said piston 23a sliding inside said cylinder 22b. The dredger is also fitted with a separation means 30 which is used to separate muddy water from the slurry. More specifically, a separator 31 is fitted to the slurry drainage pipe 10 downstream of the rotary drainage pump 20 in order to remove muddy water from the slurry which is traveling along the pipe. A return pipe 32 is connected at one end to the muddy water discharge port of the separator 31 and at the other end to the end of the rotor shaft of the aforementioned rotary drainage pump 20. The rotor shaft itself contains a hole running between said return pipe 32 with which it connects at one end and said pressure chamber 22c with which it connects at the other end. Said return pipe 32 is also fitted with a filter 33 which is used to filter the muddy water. The mesh size of the filter 33 is selected so as to ensure that the particles left in the muddy water downstream of said filter 33 do riot exceed the clearance normally set between said cylinders 22b and said pistons 23a (hereafter referred to as the "standard clearance"). A pump 40 is fitted to the return pipe 32 downstream of the filter 33 for the purpose of boosting the flow of muddy water along the pipe.

Thus, in the preferred embodiment of the invention described above, when the rotor 22 is rotated, the operation chambers C expand and contract and the material which is to be removed is drawn in through the intake port 21b and transported through for discharge from the discharge port 21c.

In this way, muddy water is separated out from the slurry by the separator 31 and then passed through a filter 33 in order to filter out large particles and leave only particles that do not exceed the standard clearance in terms of size, said muddy water then passing through a booster pump 40 which drives the flow along in the direction of the aforementioned pressure chamber 22c. The vanes 23 are thus pressed radially outwards by the pressurized water with the result that the ends of the vanes are kept pressed against the inner surface of the casing and the hermetic sealing of the operation chambers C is in this way maintained. Moreover, the pressurized muddy water in said pressure chamber 22c subsequently passes through the gaps between the aforementioned cylinder 22b and the aforementioned piston 23a, then through the gaps between the guide channels 22a and the vanes 23 towards the ends of the guide channels from which it is finally discharged into the operation chambers C. This flow of muddy water from the inner ends towards the outer ends of the guide channels 22a not only prevents the slurry from infiltrating said guide channels 22a from the operation chambers C but also serves as a lubrication in the spaces between the guide channels 22a and the vanes 23. This in turn helps to keep the movement of the vanes smooth and, in so doing, to ensure that the rotary drainage pump 20 also continues to function efficiently over the long term. Moreover, since the muddy water that is discharged into the operation chambers C is muddy water originally separated from said slurry, the ultimate water content of the slurry remains unchanged.

There now follows a description of a modified embodiment of the aforementioned separator 31. Said separator 31 was developed for the following reasons. In the preferred embodiment outlined above, it is sufficient simply to increase the intake flow through the rotary drainage pump 20 in order to boost the efficiency of conveyance the slurry. Unfortunately, however, this also means increasing the velocity of the flow of slurry and, if there is a lot of sand or small stones contained in the slurry, then this inevitably results in damage to the slurry drainage pipe 10 as the sand and stones grind violently against it on their way through. The impact of the sand and stones on the slurry drainage pipe 10 is, of course, particularly damaging at points where the pipe bends if the pipe does, in fact, contain bends. The present modified embodiment of the separator 31, however, carries out the precise separation of water and air from the slurry which is being pumped along by the slurry drainage pump and, in so doing, reduces the velocity of the flow of slurry while at the same time boosting the efficiency of its conveyance.

More specifically, in FIGS. 4, 5 and 6, 110 is a cylindrical casing with a circular inflow port Ill at one end and a circular outflow port 112 at the other end, said inflow port 111 and said outflow port 112 being connected by a flow path 120 along which the slurry is channeled. The slurry drainage pipe 10 is connected both to the inflow port 111 and to the outflow port 112. The bottom part of the casing 11.0 is similarly connected to the aforementioned return pipe 32.

Figure 4:
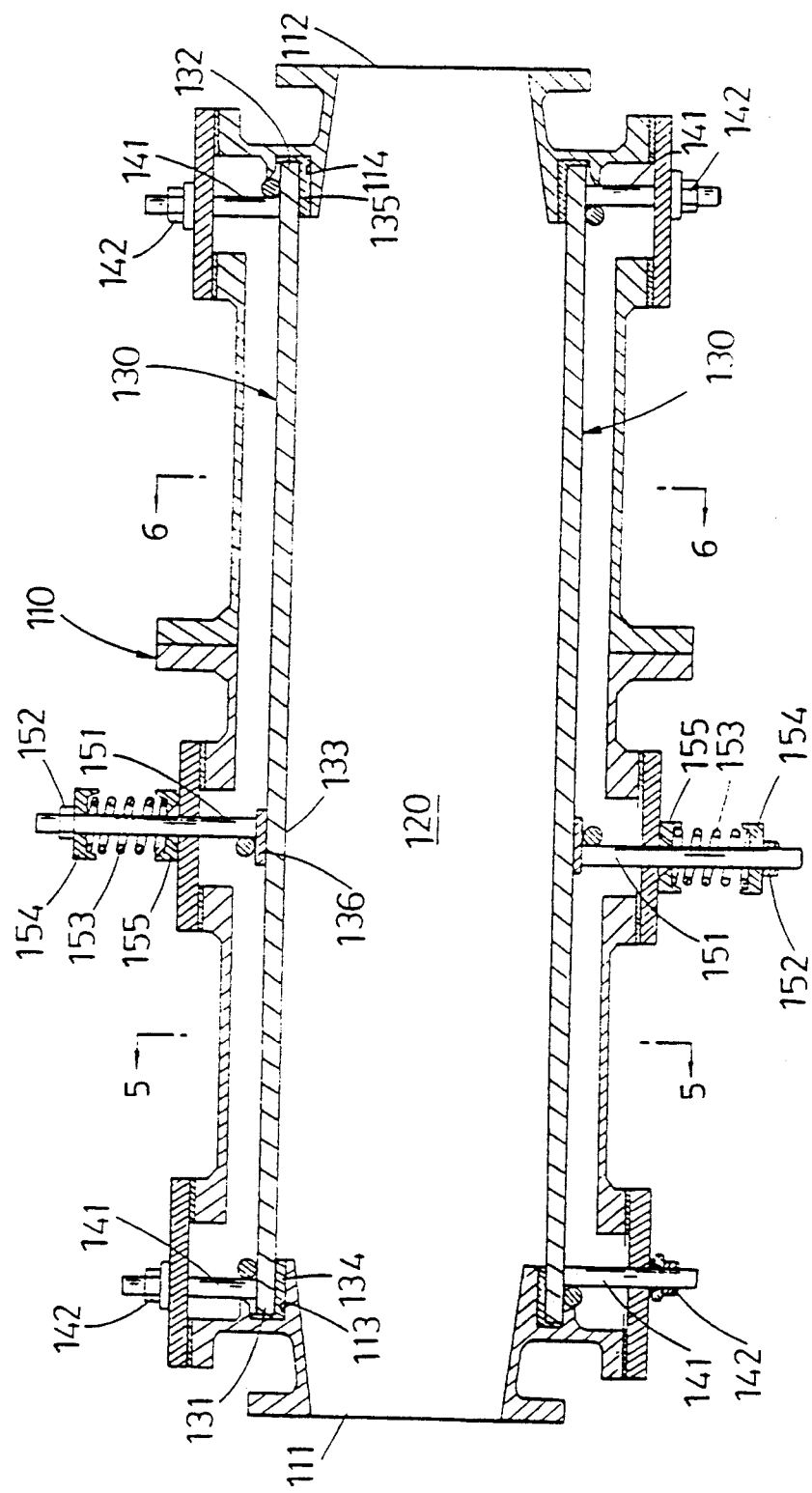
FIG. 4 is a longitudinally sectioned front view of a modified embodiment of the separator.
Figure 5:
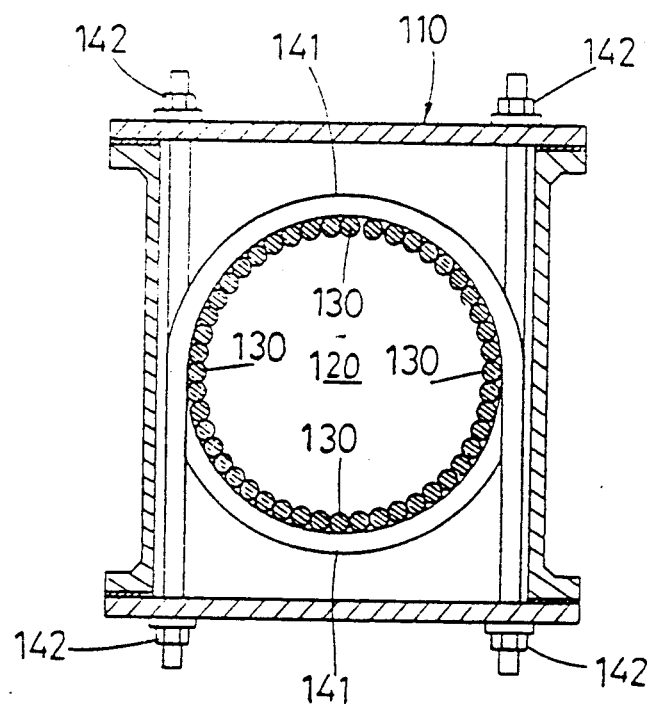
FIG. 5 is a cross section view taken in the line A—A of FIG. 4.

The casing 110 is provided with one ring groove 113 in its inner wall right around the perimeter of the inflow port 111 and another ring groove 114 in the inner wall of the casing around the perimeter of the outflow port 112. The inside of the casing is also fitted with a plurality of circular, stainless steel rods 130, which are arranged side by side with each other and without gaps in between such that they completely surround the slurry path 120. Each end 131, 132 of the circular rods 130 is slotted into ring grooves 113, 114 around the perimeters of the inflow port 111 and the outflow port 112. The ends 131,132 of the circular rods 130 are secured to the casing 110 by two pairs of U bolts 141,141 one pair at each end. The U bolts 141,141 at each end are fitted opposite each other, one at the top and one at the bottom of the casing 110, such that together each pair of U-bolts 141, 141 completely encloses one of the groupings of rod ends 131, 132 of the circular rods 130 as shown in FIGS. 4 and 5. The ends of the U bolts 141 themselves are fastened to the casing 110 by nuts 142,142. At a point 133 mid-way along the circular rods 130 is another pair of U bolts 151,151 which also secure said rods 130 to the casing 110. These U bolts 151,151 are also fitted opposite each other, one at the top and one at the bottom of the casing 110, such that all the circular rods 130 are enclosed from above and below at a point 133 mid-way along said rods 130. The ends of the U bolts 151,151 each pass through the casing 110 at which point they also pass through spring holders 154,155 into which coil springs 153 are mounted. 152 is a nut which is used to secure said spring holder 154 in place. The middle part 133 of the circular rods 130 is thus secured to the casing 110 in such a way as to permit the middles of the rods a measure of radial flexure (up and down in FIG. 4). 134 and 135 are natural rubber sheets which are fitted between the ends 131,132 of the circular rods 130 and the ring grooves 113,114. 136 is a natural rubber sheet which is similarly fitted between the middles 133 of the circular rods 130 and the U bolts 151,151.

Figure 6:
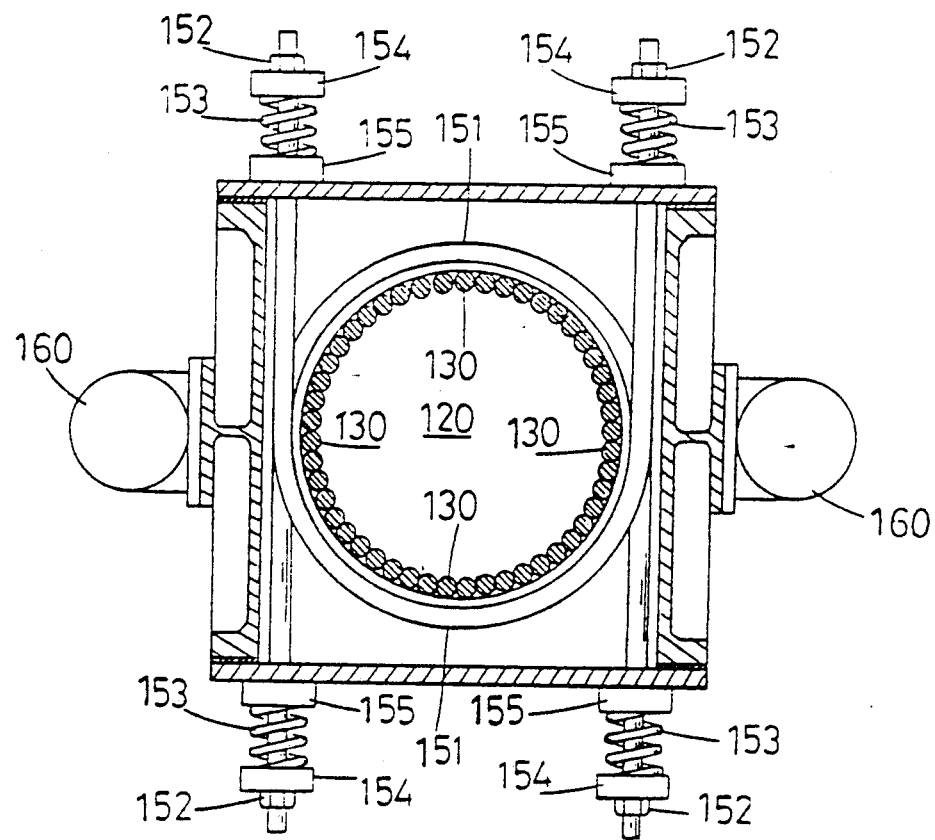
FIG. 6 is a cross section view taken in the line B—B of FIG. 4.

A known vibrator 160 is fitted to the casing 110, as shown in FIG. 6, in order to make said circular rods 130 vibrate.

Thus, in this modified embodiment of the separator, when slurry flows into the separator from the slurry drainage pipe 10 and travels along the slurry flow path 120, the circular rods 130 respond to the pulsating movement of the slurry by flexing in a radial direction (up and down in FIG. 4) and gaps are thus periodically formed between said rods 130. As a result, water contained in the slurry is passed into the casing through the gaps that form between the lower circular rods, and air contained in the slurry is similarly allowed to escape into the casing through the gaps that form between the upper circular rods. By virtue of the separation of the water and air tile efficiency of transportation of the slurry is enhanced while the velocity at which the slurry is traveling is at the same time reduced, thereby preventing the occurrence of damage to the slurry drainage pipe 10 caused by the sand and small stones contained in the slurry.

The circular rods 130 are, moreover, caused to vibrate by the action of the aforementioned vibrator 160 and this encourages the formation of gaps between said rods, thereby enhancing the capacity of the separator to separate water and air from the slurry.

There is, however, no absolute need to fit said vibrator 160 since the separator is designed to function perfectly adequately in response to the pulsating movement of the slurry alone.

The preferred embodiment described above also involved the use of a cylinder 22b and a piston 23a but these parts may equally be left out. In this sort of case, it would of course be necessary to connect the pressure chamber 22c directly to the inner ends of the guide channels. It is, moreover, possible to conceive of the use of a variety of different types of separators. The important point, however, is to make sure that the separator used is at least capable of ensuring that the size of the particles in the muddy water that is separated out does not exceed the normal clearance between the guide channels and the vanes.

What is claimed is:

1. A lubrication device for the lubrication of a rotary drainage pump, said rotary drainage pump comprising a casing incorporating a rotor chamber that connects with an intake port and a discharge port, the rotor inside said rotor chamber having the capacity to rotate eccentrically with respect to the center of said rotor chamber and also having guide channels extending along the radius of rotation, and vanes fitted such that they are able to travel radially into said guide channels while at the same time dividing the space between said casing and said rotor into a plurality of operation chambers, a separation means being set tip to separate muddy water from slurry discharged from said discharge port, a pressure chamber being incorporated into said rotor and connected to inner ends of each of said guide channels, and pipes being connected to enable the muddy water separated out by said separation means to be fed into said pressure chamber.

2. The lubrication device according to claim 1 in which said pressure chamber, is connected directly to inner ends of the guide channels.

3. The lubrication device according to claim 1 in which cylinders are incorporated into the bottoms of said guide channels such that said cylinders connect with said pressure chamber, and cylindrical pistons, which slide inside said cylinders, are connected to bases of said vanes.

4. The lubrication device according to claim 1 in which said separation means comprises (a) a separator to separate muddy water from slurry, and (b) a filter to filter the muddy water discharged from said separator.

5. The lubrication device according to claim 4 in which a return pipe is connected to said separator at a muddy water discharge port, said return pipe also being connected to the end of the rotor shaft of said rotary drainage pump, and a hole is incorporated into said rotor shaft such that one end of said hole connects with said return pipe and the other end of said hole connects with said pressure chamber.

6. The lubrication device according to claim 4 in which said filter has a mesh size set so as to filter the muddy water as it flows downstream and remove particles of a diameter greater than that of a lubrication area clearance.

7. The lubrication device according to claim 6 in which cylinders are incorporated into bottoms of said guide channels such that said cylinders connect with said pressure chamber, cylindrical pistons, which slide inside said cylinders, are connected to bases of said vanes, and said lubrication area clearance constitutes the normal clearance between said cylinders and said pistons.

8. The lubrication device of claim 4, further including a separator, said separator comprising (c) a casing (d) a plurality of circular rods secured at both ends to said casing and arranged side by side around the inside of said casing without gaps between them such that they completely surround the slurry flow path, and (d) a retaining fitting that secures said circular rods to the casing at the middle of each said circular rod in such a way that said circular rods have scope to flex in a radial direction.

9. The separator according to claim 8 in which a vibrator is fitted to said casing for the purpose of making said circular rods vibrate.

10. The separator according to claim 8 in which one ring groove is incorporated into the inner wall of said casing around the perimeter of an inflow port and another ring groove is incorporated into the inner wall of said casing around the perimeter of an outflow port, and the two ends of each of said circular rods are slotted into said ring grooves.

11. The separator according to claim 10 which has pairs of U bolts fitted opposite each other above and below the casing such that they enclose the two ends of each of said circular rods from above and below, the ends of said U bolts being fastened to said casing.

12. The separator according to claim 10 comprises (f) a pair of U bolts arranged opposite each other above and below said casing such that they enclose all of said circular rods from above and below, at the middle of each circular rod, said U bolts including end portions which pass through said casing, (g) spring holders mounted at the ends of said U bolts and at the points on the outside of the casing where the U bolts pass through said casing, and (h) coil springs mounted between said spring holders.

13. The separator according to claim 12 in which a vibrator is fitted to the casing.

* * * * *

UNITED STATES PATENT AND TRADEMARK OFFICE
CERTIFICATE OF CORRECTION

PATENT NO. : 5,259,741
DATED : November 9, 1993
INVENTOR(S) : Kozaburo Nitta

It is certified that error appears in the above-identified patent and that said Letters Patent is hereby corrected as shown below:

On title page, item [73] should read as follows:

--"KOYO TECHNICAL ENGINEERING CORPORATION"--

Signed and Sealed this

Fifth Day of July, 1994

BRUCE LEHMAN

Attest:

Attesting Officer             Commissioner of Patents and Trademarks